(12) United States Patent
Zheng et al.

(10) Patent No.: US 8,984,741 B2
(45) Date of Patent: Mar. 24, 2015

(54) DIFFERENTIATED LIFTOFF PROCESS FOR ULTRA-SHALLOW MASK DEFINED NARROW TRACKWIDTH MAGNETIC SENSOR

(75) Inventors: Yi Zheng, San Ramon, CA (US);
Guomin Mao, San Jose, CA (US);
Hicham M. Sougrati, Elk Grove, CA (US); Xiaozhong Dang, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 314 days.

(21) Appl. No.: 13/458,374

(22) Filed: Apr. 27, 2012

(65) Prior Publication Data
US 2013/0284693 A1    Oct. 31, 2013

(51) Int. Cl.
G11B 5/127   (2006.01)
H04R 31/00   (2006.01)
G11B 5/31    (2006.01)
G11B 5/39    (2006.01)

(52) U.S. Cl.
CPC .............. G11B 5/3163 (2013.01); G11B 5/398 (2013.01)
USPC .................. 29/603.16; 29/603.13; 29/603.14; 29/603.15; 29/603.18; 216/62; 216/65; 216/66; 360/324.1; 360/324.11; 360/324.12; 360/324.2

(58) Field of Classification Search
USPC ............... 29/603.07, 603.13–603.16, 603.18; 216/62, 65, 66; 360/324.1, 324.2, 360/324.11, 324.12
See application file for complete search history.

(56) References Cited

U.S. PATENT DOCUMENTS

| 6,483,672 | B1  | 11/2002 | Arnett et al. |
| 6,762,910 | B1  | 7/2004  | Knapp et al. |
| 6,844,998 | B2  | 1/2005  | Aoki et al. |
| 6,858,909 | B2* | 2/2005  | Cyrille et al. .................. 257/414 |
| 6,969,625 | B2* | 11/2005 | Cyrille et al. .................. 438/24 |
| 7,008,550 | B2* | 3/2006  | Li et al. ........................ 216/22 |
| 7,133,263 | B2  | 11/2006 | Lee et al. |
| 7,343,667 | B2  | 3/2008  | Lille |
| 7,472,469 | B2  | 1/2009  | Heim et al. |
| 7,506,429 | B2  | 3/2009  | Zolla et al. |
| 7,561,384 | B2  | 7/2009  | Osugi et al. |
| 8,011,084 | B2  | 9/2011  | Le et al. |
| 8,296,930 | B2* | 10/2012 | Funada et al. ............. 29/603.14 |
| 8,506,828 | B1* | 8/2013  | Osugi et al. ................. 216/22 |
| 8,796,152 | B2* | 8/2014  | Mao et al. ................... 438/712 |

OTHER PUBLICATIONS

Zheng et al., "Side-Shielded TGMR Reader With Reduction Scheme," Magnetics Conference 2006, INTERMAG 2006, IEEE International, May 8-12, 2006, pp. 348.

* cited by examiner

*Primary Examiner* — Paul D Kim
(74) *Attorney, Agent, or Firm* — Zilka-Kotab, PC

(57) ABSTRACT

A method for manufacturing a magnetic read sensor allows for the construction of a very narrow trackwidth sensor while avoiding problems related to mask liftoff and shadowing related process variations across a wafer. The process involves depositing a plurality of sensor layers and forming a first mask structure. The first mask structure has a relatively large opening that encompasses a sensor area and an area adjacent to the sensor area where a hard bias structure can be deposited. A second mask structure is formed over the first mask structure and includes a first portion that is configured to define a sensor dimension and a second portion that is over the first mask structure in the field area.

10 Claims, 34 Drawing Sheets

DIFFERENTIATED LIFTOFF PROCESS FOR ULTRA-SHALLOW MASK DEFINED NARROW TRACKWIDTH MAGNETIC SENSOR

FIELD OF THE INVENTION

The present invention relates to magnetic data recording and more particularly to a method for manufacturing narrow trackwidth sensor that overcomes problems related to liftoff of a narrow trackwidth mask.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor, or a Tunnel Junction Magnetoresisive (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When a sense current is conducted through the spin valve sensor, resistance changes cause potential changes that are detected and processed as playback signals.

In order to maximize data density it is useful to minimize various dimensions of the magnetic read head. For example, in order to increase track density it is useful to minimize the width (e.g. trackwidth) of the magnetic sensor. However, various competing manufacturing challenges have limited the ability to manufacture sensors with decreased track width, especially in a manner that is reliable and uniform across the wafer on which the sensors are constructed. Therefore, there remains a need for a manufacturing process that allows a magnetic sensor to be constructed with a very narrow trackwidth and to produce such a sensor reliably and uniformly.

SUMMARY OF THE INVENTION

The present invention provides a method for manufacturing a magnetic read sensor that includes depositing a plurality of sensor layers, and forming a first mask structure over the plurality of sensor layers. The first mask structure covers a field area removed from a sensor area and has an opening that extends over the sensor area and also over an area adjacent to the sensor area. A second mask structure is formed that has a first portion that covers an area configured to define a sensor dimension and has a second portion that is formed over the portion of the first mask structure that is in the field area removed from the sensor. An ion milling is performed to remove portions of the sensor material that are not covered by the first mask structure.

The process can use a hard mask layer, deposited prior to formation of the second mask structure, that is formed of a material that is deposited by a process other than spin coating in order to avoid high temperature curing of the first mask structure. Alternatively, the process can include the deposition of a Si hard mask layer deposited by a spin on process. However, in that case the first mask structure can be formed of a photoresist that can withstand high temperatures without becoming fully cured.

The process can also be performed without the use of an organic image transfer layer such as DURIMIDE®. In that case, a hard mask layer having a low ion milling rate can be deposited after the formation of the first mask in order to help transfer the image of the second mask structure onto the under-lying sensor layers.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
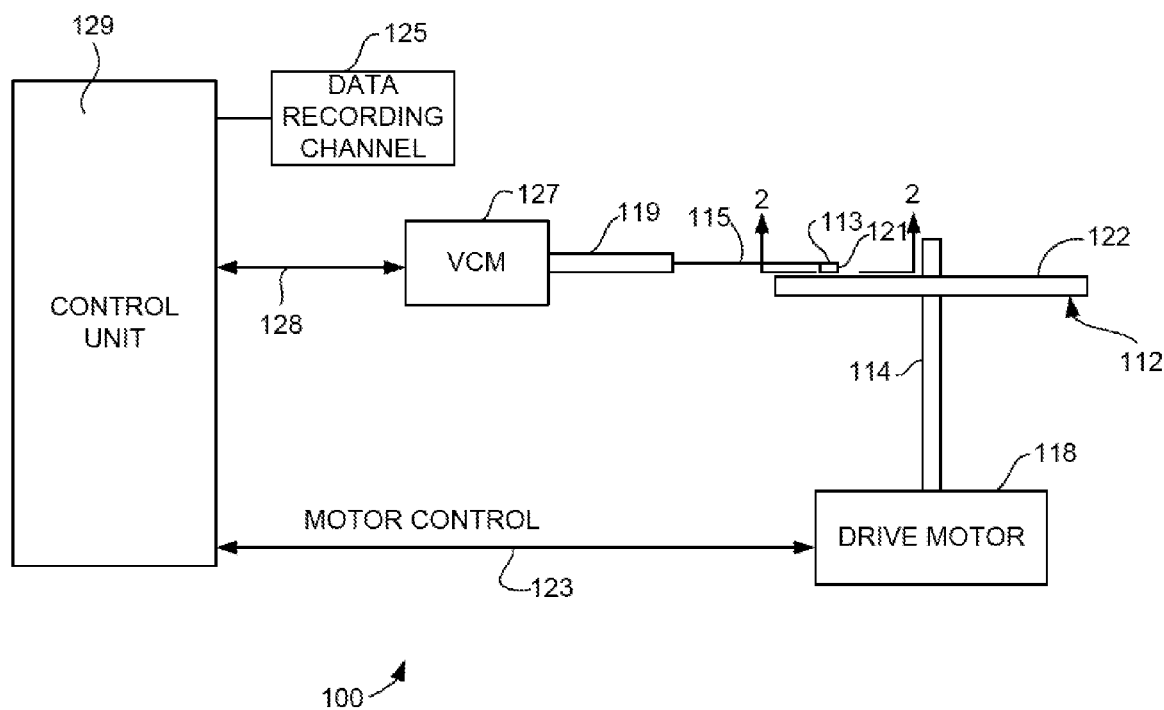
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
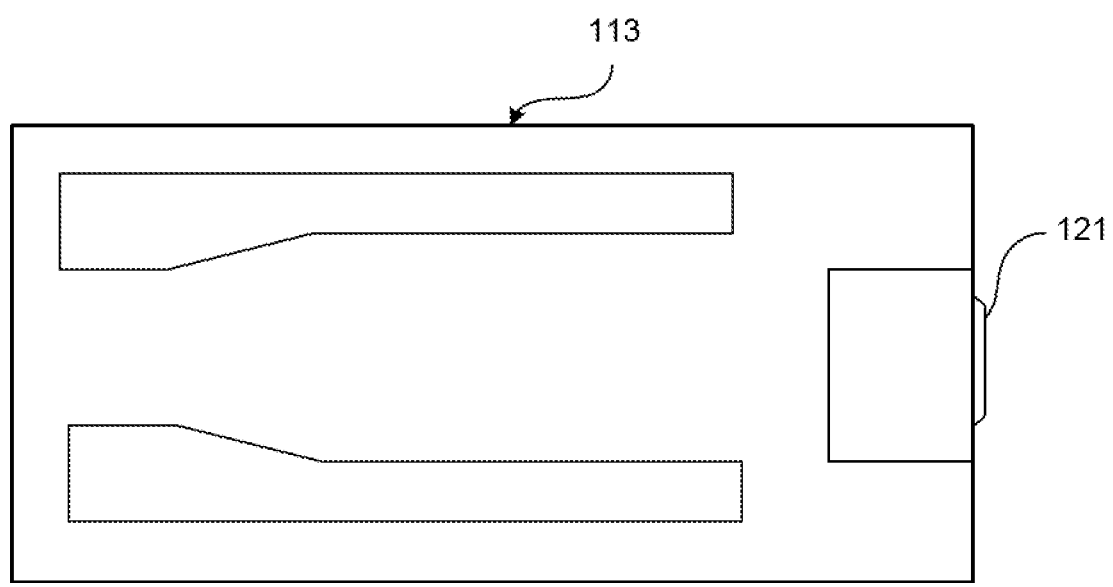
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
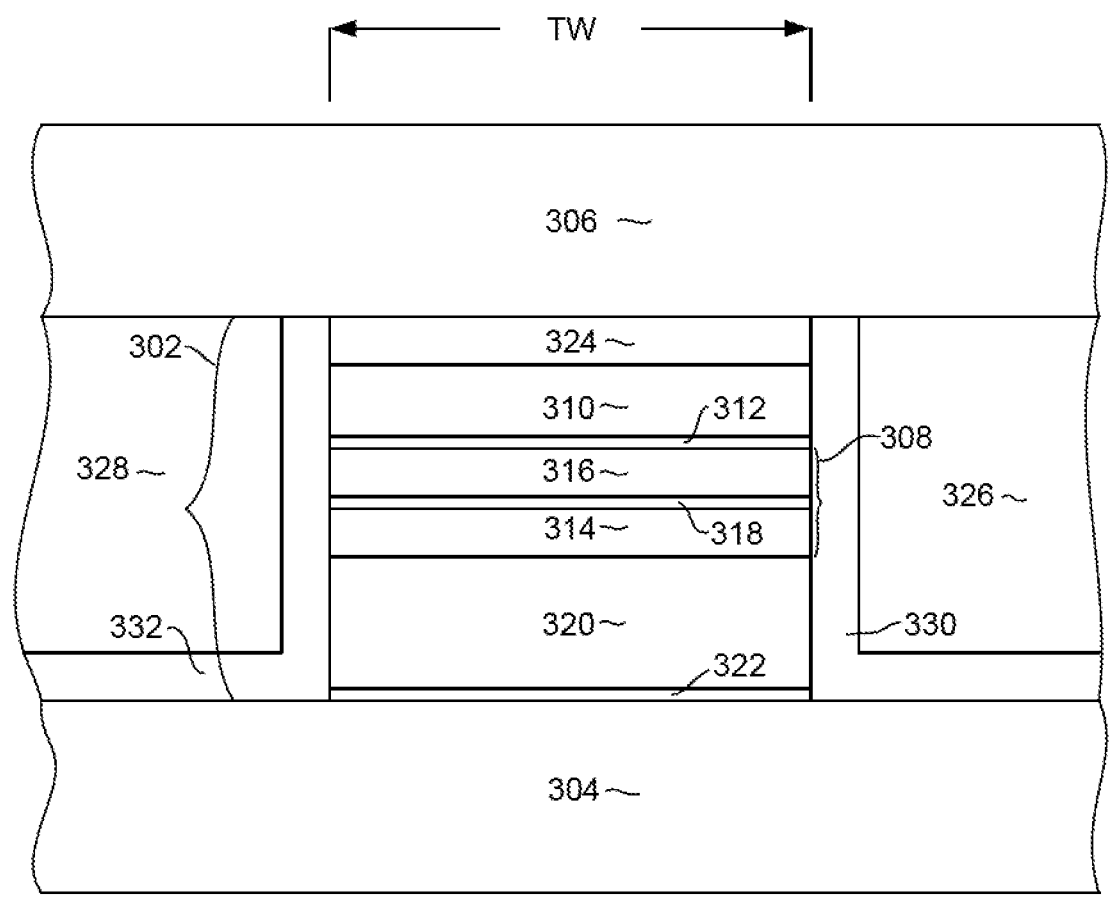
FIG. 3 is an ABS view of a magnetic read head.

FIG. 3 shows a magnetic read sensor as seen from the air bearing surface ABS. As can be seen, the read sensor includes a sensor stack 302 that is sandwiched between first and second magnetic shields 304, 306. The magnetic shields 304, 306 can be constructed of an electrically conductive, magnetic material so that they can function as electrical leads as well as magnetic shields.

The sensor stack 302 can include a pinned layer structure 308, a magnetic free layer structure 310 and a non-magnetic spacer or barrier layer 312 sandwiched between the pinned layer structure 308 and free layer structure 310. The pinned layer structure 308 can include first and second magnetic layers 314, 316 that are antiparallel coupled across a non-magnetic AP coupling layer such as Ru 318 sandwiched there-between. The first magnetic layer 314 can be exchange coupled with a layer of antiferromagnetic material 320. This exchange coupling strongly pins the magnetization of the first magnetic layer 314 in a first direction perpendicular with the ABS. The antiparallel coupling between the first and second magnetic layers 314, 316 pins the magnetization of the second magnetic layer 316 in a second direction that is antiparallel with the first direction and perpendicular with the ABS.

In addition, the sensor stack 302 may also include a seed layer structure 322 that initiates a desired grain formation in the above formed layers of the sensor stack 302. Also, a capping layer 324 can be provided at the top of the sensor stack 302 to protect the layers of the sensor stack during manufacture.

The sensor may also include first and second hard magnetic bias layers 326, 328 formed at either side of the sensor stack 302 to provide a magnetic bias field to bias a magnetization of the free layer 310 in a desired direction that is substantially parallel with the ABS. First and second non-magnetic electrically insulating layers 330, 332 separate the bias layers 326, 328 from the sides of the sensor stack 302 and from the shield 304 in order to prevent electrical shunting.

As those skilled in the art will appreciate, the sensor stack 302 has a width TW that defines the track width of the sensor. In order to maximize the data density of the recording system it is useful to minimize this width TW. However, certain manufacturing limitations have limited the amount by which this width TW can be practically reduced. For example, a mask structure must be sufficiently tall to be effectively removed after the sensor has been patterned. However, a tall mask increases shadowing effects during ion milling, which leads to ion milling variations across the wafer. In addition, making the mask thick limits the amount by which the sensor defining mask can be narrowed to define a smaller track width. Masks constructed using currently available technologies have a certain minimum aspect ratio that must be maintained to avoid deformation of the mask. For example, if the mask is very tall and narrow it will deform by bending over, which is of course unacceptable. The present invention provides a manufacturing process that overcomes all of these challenges, thereby allowing a sensor to be defined with a very narrow trackwidth and without shadowing related process variations.

Figure 4:
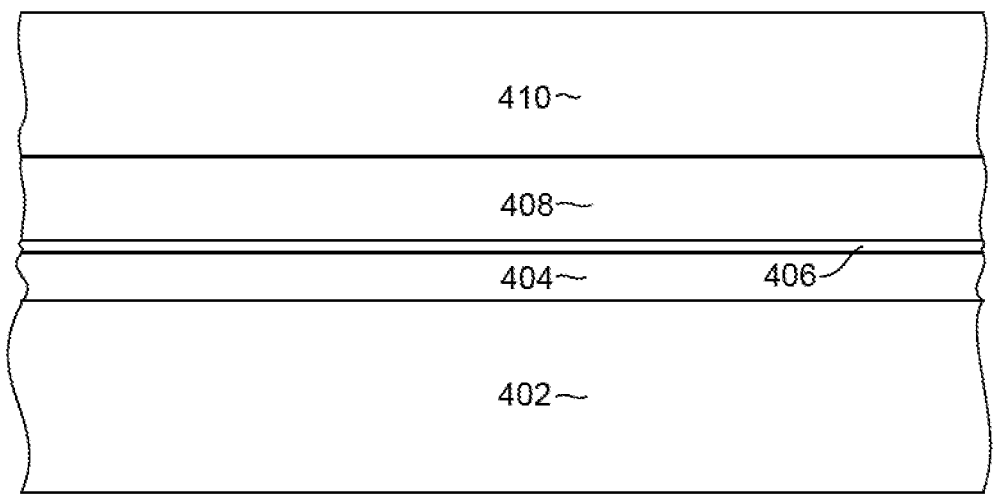
FIGS. 4-14 are views of a magnetic read head in various intermediate stages of manufacture, illustrating a method of manufacturing a magnetic read head according to an embodiment of the invention.

FIGS. 4-14 show a magnetic sensor in various stages of manufacture in order to illustrate a method of manufacturing a magnetic sensor according to an embodiment of the invention. With particular reference to FIG. 4, an electrically conductive, magnetic shield 402 is formed, and a sensor material 404 is deposited over the shield 402. The sensor material can include the various sensor layers of the sensor stack 302 described above with reference to FIG. 3, but can also include sensor layers of some other type of sensor structure.

A layer of material that is resistant to chemical mechanical polishing (first CMP stop layer 406) is deposited over the sensor layers 404. This first CMP stop layer 406 can be a material such as diamond like carbon (DLC) or amorphous carbon. This material layer 406 can also function as a hard mask layer as will be seen. Then, an image transfer layer 408 is deposited over the first CMP stop layer 406. The image transfer layer is preferably a soluble polyimide material that that can be removed by reactive ion etching, but has some resistance to ion milling and that can be readily removed by a process such as NMP liftoff, as will be seen. To this end, the image transfer layer can be constructed of DURIMIDE® and is preferably deposited to a thickness of 20-100 nm or about 50 nm. It should be pointed out here that the organic image transfer layer 408 can be deposited much thinner than would be possible using prior art processes. This reduced thickness of the image transfer layer is advantageous for reasons that will be clearer below and is made possible by the process of the present invention as will also be described in greater detail herein below. A first layer of photoresist material (first resist layer) 410 is then deposited over the image transfer layer 408.

Figure 5:
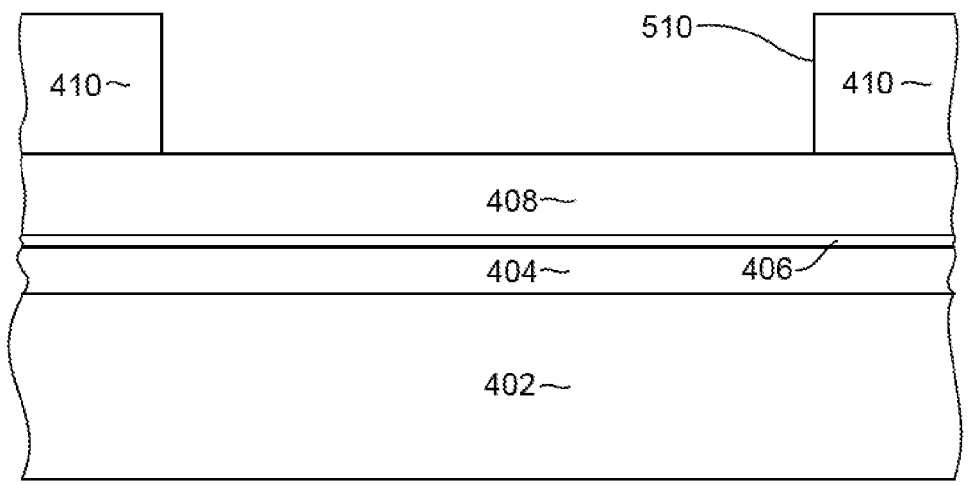

Then, with reference to FIG. 5, the first resist layer 410 is photolithographically patterned to form a first mask 410 having a relatively large opening 510 which is significantly wider than the area where the sensor will be formed, and is large enough to encompass an area where the hard bias layers will be formed, as will be better illustrated below. The first resist pattern 410 will then go through post-develop bake at temperature much lower than its full curing temperature or (i.e. much lower than 200 degrees C.) in preparation of subsequent hardmask deposition.

Figure 6:
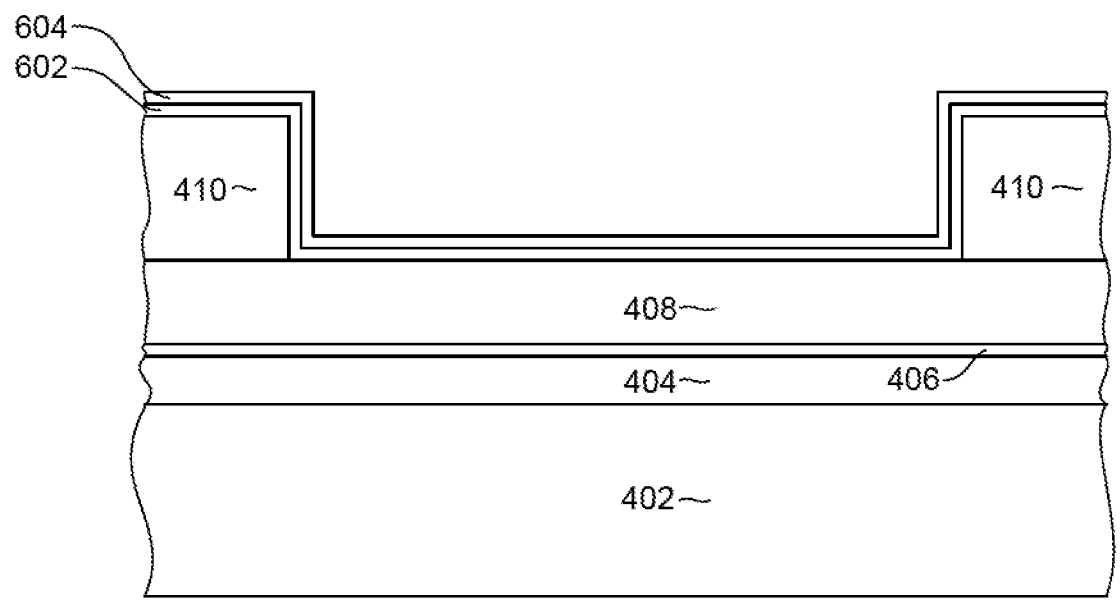

With reference now to FIG. 6, a layer of hard mask material 602 is deposited, followed by an optional BARC layer 604. The hard mask layer 602 is preferably constructed of $SiO_2$ or could also be constructed of SiN, $SiO_xN_y$, TaO or $Ta_2O_5$, SiC, $Al_2O_3$, TiN or Cr. The hard mask layer 602 is preferably deposited by a process such as sputter deposition or atomic layer deposition. Prior art hard mask layers were deposited by a spin-on process that involved the use of high temperatures (i.e. higher than 200 degrees C.). In order to prevent these high temperatures from fully curing the resist layer (which would make it impossible to remove later), the resist had to be made thicker than would otherwise be necessary. In order to prevent this, in the present invention the hard mask layer 602 is deposited by one of the other methods mentioned above, which do not involve the use of such high temperatures. The deposition temperature could be as low as room temperature. This allows the resist 410 to be thinner, such as 60-600 nm or about 100 nm. The optional BARC layer 604 can be a thin layer of carbon (e.g. diamond like carbon (DLC), amorphous carbon, etc.) which can be deposited by sputter deposition or can be a spin-on BARC such as ARC29® by BreweScience®.

Figure 7:
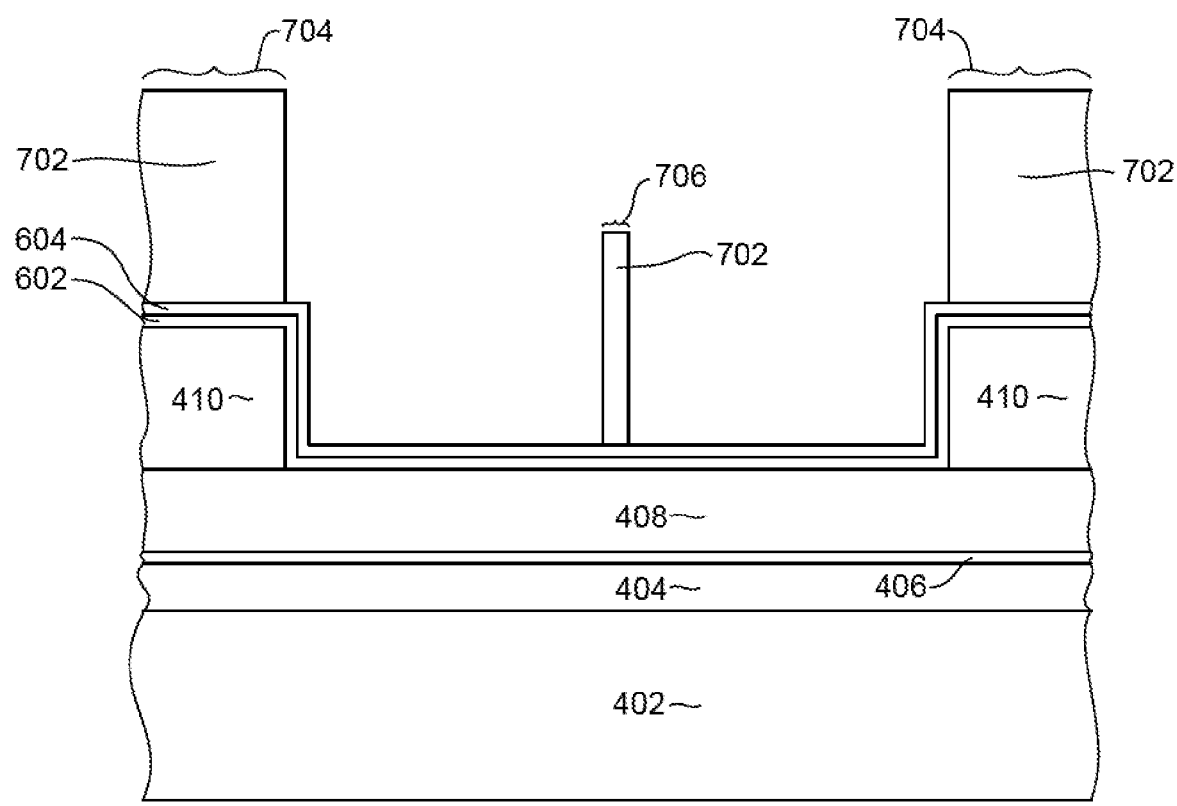

With reference now to FIG. 7, a second resist mask 702 is formed over the first resist 410, hard mask 602 and BARC layer 604. This second resist mask 702 provides the actual stencil that will be used to define the sensor. To this end, the second mask 702 has outer portions 704 that are at least partially formed over the first resist mask 410 (although the layers 602, 604 are between the two resist masks 410, 702), and has an inner portion 706 that is configured to define a dimension (e.g. trackwidth) of the sensor. It can be seen in FIG. 7 that the outer portions 704, which are formed over the first resist mask 410 are at a higher elevation than the central sensor defining portion 706. This is beneficial for reasons that will become apparent below.

After the second resist mask 702 has been defined, one or more reactive ion etching processes (RIE) are performed to remove portions of 602, 604 that are not protected by the second resist mask 702 in order to transfer the image of the second resist mask 702 onto these under-lying layers 602, 604, 408, 406. This preferably includes performing a first reactive ion etching in a first chemistry to transfer the image of the mask 702 onto the BARC layer 604 and hardmask layer 602 and then performing a second reactive ion etching in a second chemistry to transfer the image of the layers 604 and 602 onto the under-lying image transfer layer 408 and the first CMP stop layer 406. This process also removes most or all of the second resist mask 702 and BARC layer 604, leaving a structure such as that shown in FIG. 8.

Figure 8:
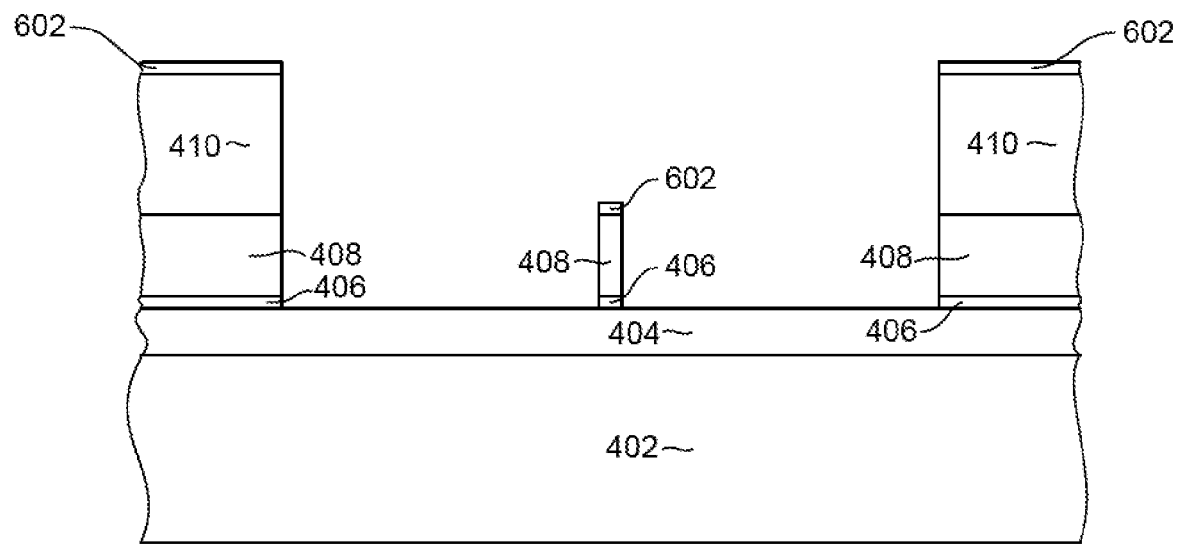
Figure 9:
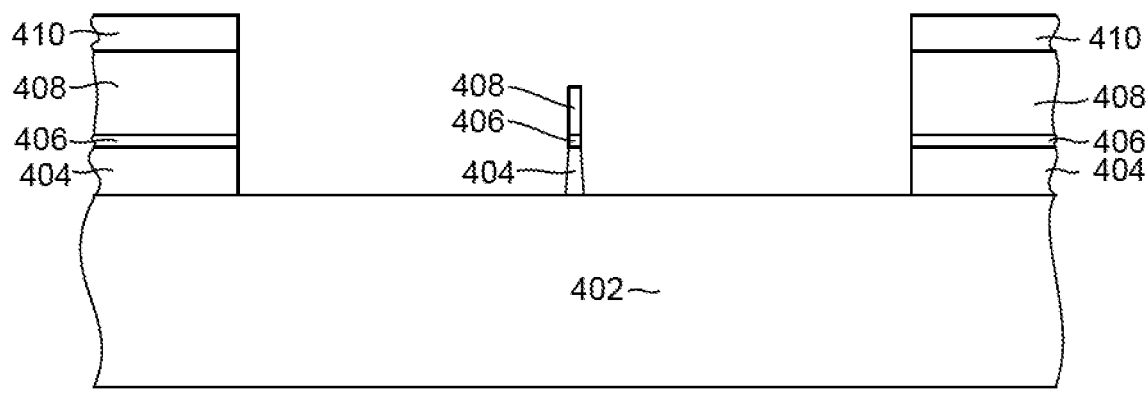

Then, with reference to FIG. 8, an ion milling is performed to remove portions of the sensor layers that are not protected by the remaining image transfer layer 408, the first CMP stop layer 406 and hard mask 602 to transfer the image of the layers 602, 408 and 406 onto the sensor material 404. This leaves a structure such as that shown in FIG. 9. It should be pointed out that the above process allows the image transfer layer 408 to be shorter in the vertical direction (e.g. not deposited as thick) which also allows it to be formed narrower for reduced track width without the risk of deforming the image transfer layer 408 (e.g. allowing the image transfer layer 408 to maintain the aspect ratio).

Figure 10:
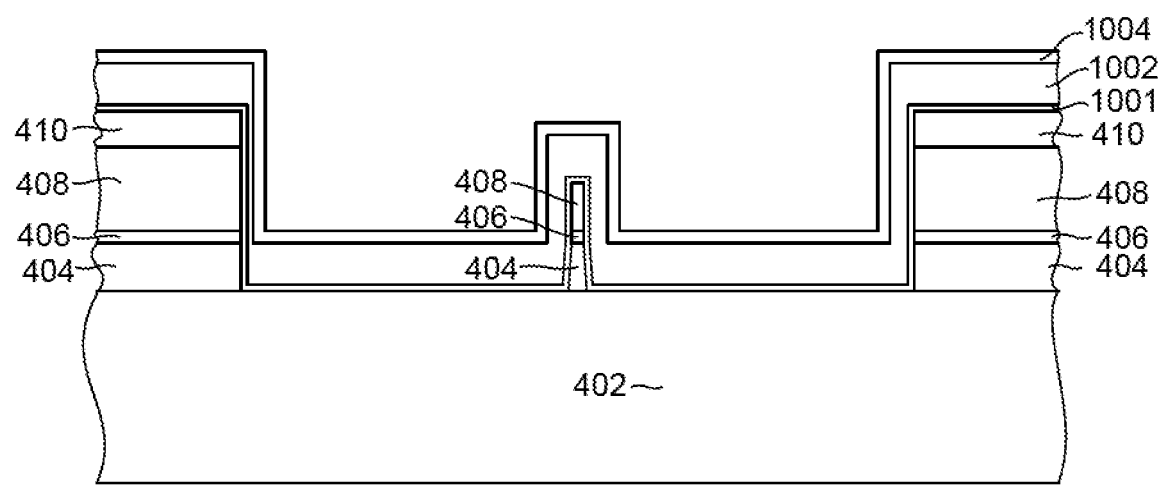

With reference now to FIG. 10, a hard bias structure is deposited by first depositing a thin dielectric layer such as alumina 1001 then depositing a hard magnetic material 1002 such as CoPt or CoPtCr or some other suitable hard magnetic material. The deposition of the hard magnetic material 1002 may also include the deposition of one or more seed layers, which are not shown in FIG. 10 for purposes of clarity. A layer of material that is resistant to chemical mechanical polishing (second CMP stop layer) 1004 such as diamond like carbon (DLC) or amorphous carbon is deposited over the hard magnetic material. A capping layer may also be deposited between the hard magnetic material 1002 and the second CMP stop layer 1004, but is not shown here for purposes of clarity.

Figure 11:
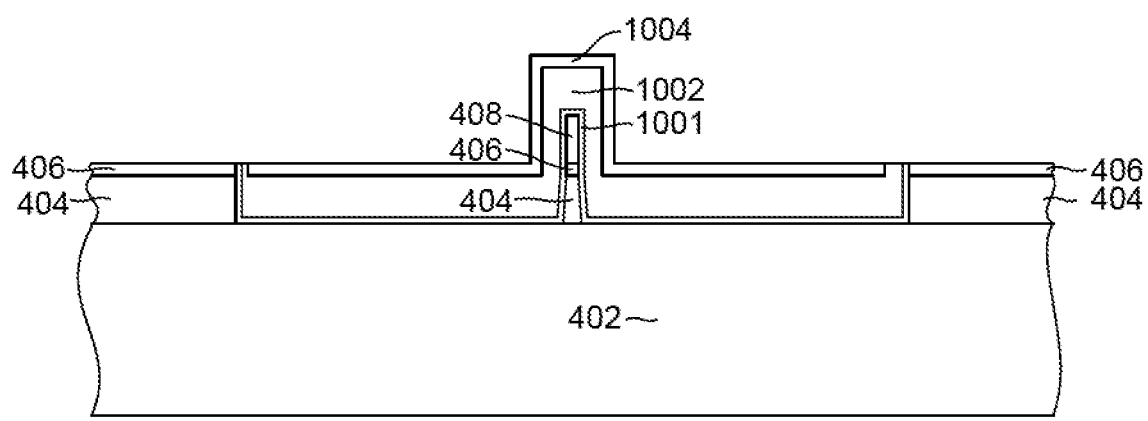

After the hard bias structure 1002 and CMP stop layer 1004 have been deposited, a lift off process can be performed to remove portions of the mask layers 408, 410, and overlying layers 1001, 1002, 1004 in the field. The term "in the field" as used here refers to areas away from the sensor area and area where the hard bias material will remain. The liftoff process can include wrinkle baking, NMP chemical liftoff and snow cleaning (i.e. cleaning using $CO_2$). This liftoff process leaves a structure as shown in FIG. 11, with the mask removed in the field area, but with the mask 406, 408, and layers 1001, 1002, 1004 remaining over the centrally disposed sensor 404.

Figure 12:
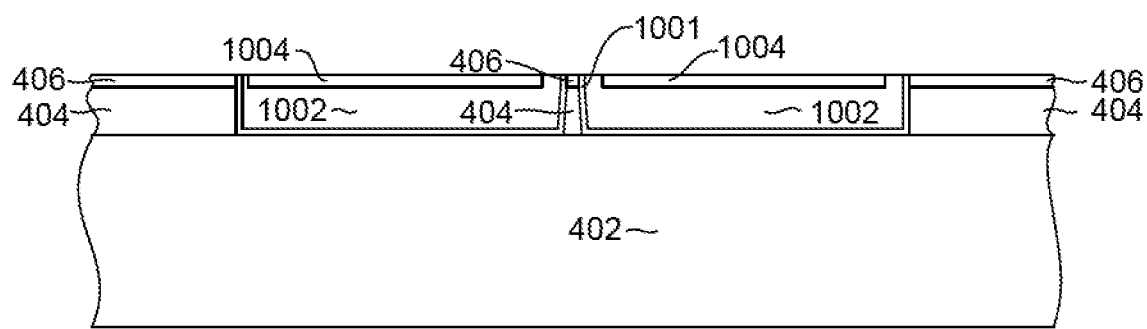

After the liftoff process has been used to remove the mask layers in the field, a chemical mechanical polishing process can be used to further planarize the structure to remove the mask from over the sensor area, leaving a structure as shown in FIG. 12. As those skilled in the art will appreciate, chemical mechanical polishing is good for removing small topographic features (such as the layers over the sensor in FIG. 11). However, CMP is not very good for removing large areas of material, such as the mask in the field as shown in FIG. 10. For this reason, liftoff processes previously described with reference to FIGS. 10 and 11 can be used to remove these mask layers in the field. It can be pointed out here, that presence of first layer 4104 in the field advantageously raises the features of layers 408, 410, 1001, 1002, 1004 in the field, making it much easier to remove these layers by the previously described liftoff process as both the remaining first layer 410 and image layer 408 in the field area are soluble in NMP liftoff chemical.

Figure 13:
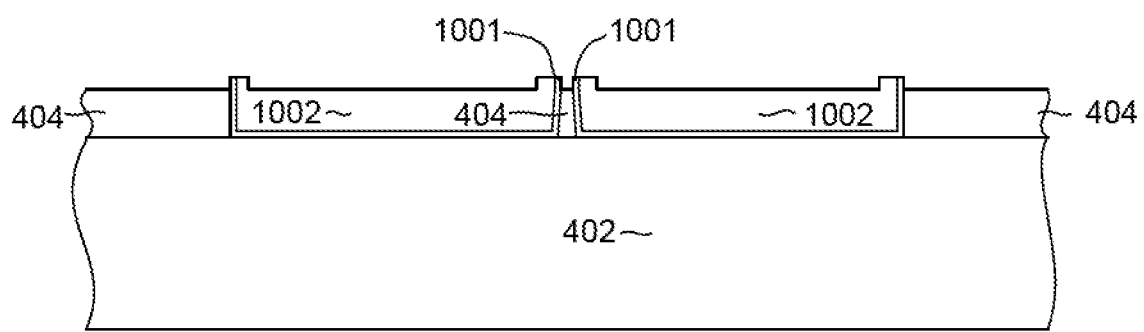
Figure 14:
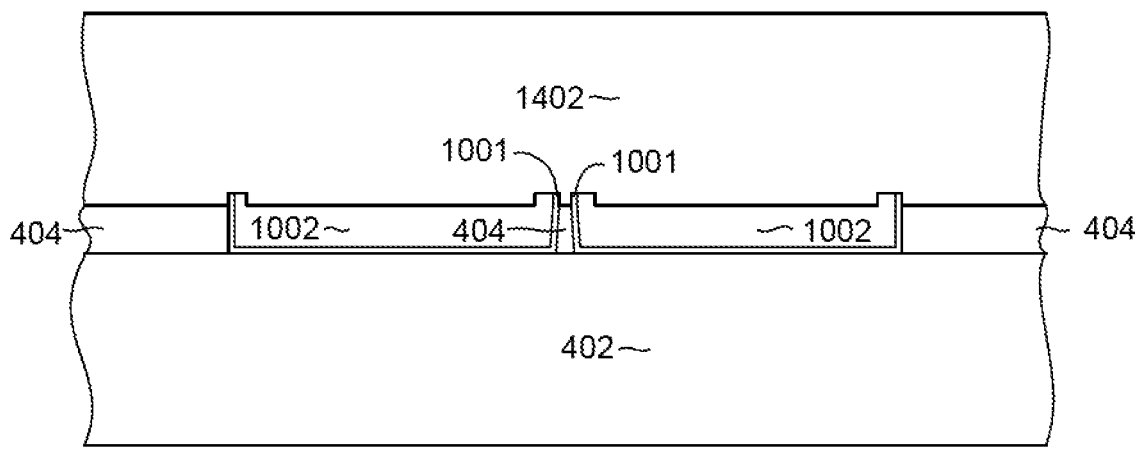

After the above described CMP process has been performed to form the structure as shown in FIG. 12, a reactive ion etching can be performed to remove the CMP stop layers 1004, 406, leaving a structure as shown in FIG. 13. Then, an electroplating process can be performed to construct a magnetic shield 1402 as shown in FIG. 14. The shield 1402 can be constructed of a magnetic, electrically conductive material such as NiFe. It can be seen that the above described process allows a magnetic sensor to be constructed with smaller dimensions that would have been possible using previously available process. Furthermore, the above described process reduces shadowing related process variations and facilitates mask liftoff in the field region.

Figure 15:
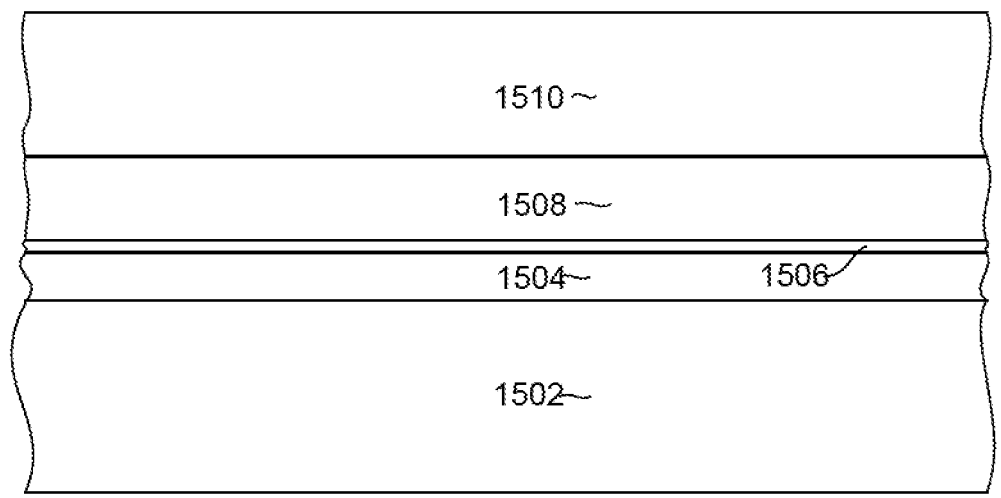
FIGS. 15-24 are views of a magnetic read head in various intermediate stages of manufacture, illustrating a method of manufacturing a magnetic read head according to an alternate embodiment of the invention.

FIGS. 15-24 illustrate a method for manufacturing a magnetic sensor according to another embodiment of the invention. With particular reference to FIG. 15, a bottom magnetic shield 1502 is formed. This shield 1502 can be formed by an electroplating process and can be constructed of a material such as NiFe. A series of sensor layers, collectively referred to as sensor layers 1504 in FIG. 15, are deposited over the shield 1502. A first layer of material that is resistant to chemical mechanical polishing (first CMP stop layer 1506) is deposited over the sensor layers 1504. The first CMP stop layer can be constructed of a diamond like carbon (DLC), amorphous carbon or some similar material. A layer of image transfer material 1508 is then deposited over the first CMP stop layer 1506, and a layer of photoresist (first resist layer) 1510 is deposited over the image transfer layer 1508. The image transfer layer 1508 can be a polyimide material such as DURIMIDE® that is resistant to ion milling, but which can be removed by reactive ion etching (RIE), and which be removed after ion milling. As with the above described embodiment the image transfer layer can be made thinner than would be possible with prior art processes. To this end, the image transfer layer can have a thickness of 30-100 nm or about 50 nm. The resist layer 1510 is a resist material that can withstand elevated temperatures without becoming fully cured or fully hard-baked for reasons that will become apparent below. The first resist layer 1510 can be deposited to a thickness of 50-600 nm or about 100 nm.

Figure 16:
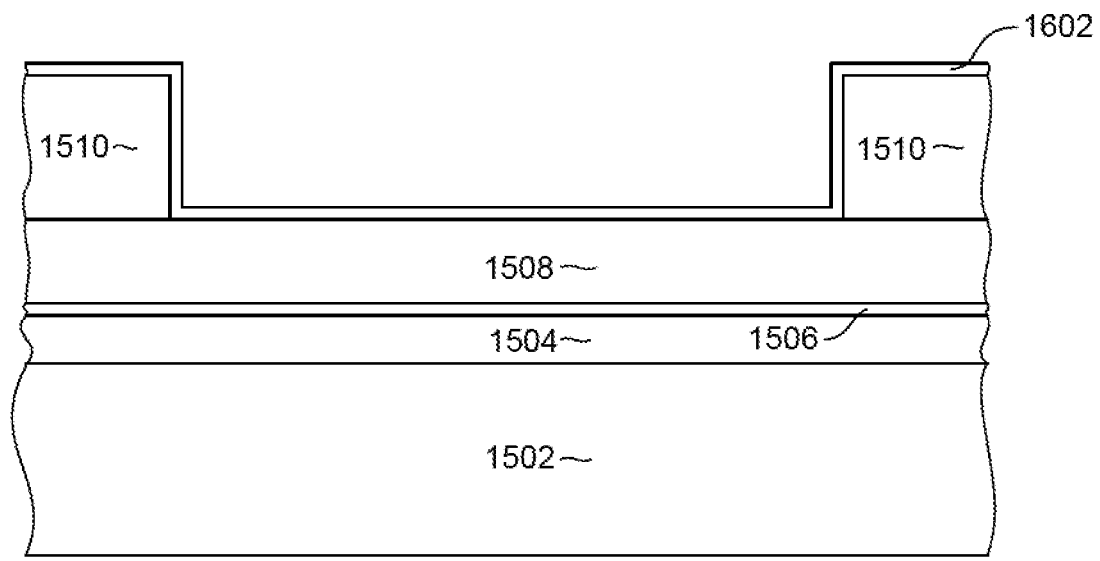

The first resist layer 1510 is photolithographically patterned and developed to form a mask as shown in FIG. 16, which covers the field area (area far removed from the sensor area) but which leaves an area over and around the intended sensor location uncovered. After the first resist layer has been patterned to form a first resist mask 1510, and go through post-develop bake at a temperature lower than its full curing temperature, a hard mask 1602 is deposited. This hard mask layer 1602 can be a silicon (Si) hard mask and can be applied by a spin on technique. It was previously discussed above, that the deposition of a Si hard mask by such a spin-on technique tends to cure the photoresist layer, thereby requiring a substantially thicker image transfer layer 1508 to allow lift-off of the mask photoresist mask, in the present invention, the resist layer 1510 is a resist that can withstand such high temperatures without becoming fully cured. Examples of such as photoresist material are ARX3001,® supplied by JSR®. An alternative option is that a lower baking temperature spin-on Si containing hardmask can be formulated by adding lower temperature cross-linker. That would also allow the use of more common resists for the first layer.

Figure 17:
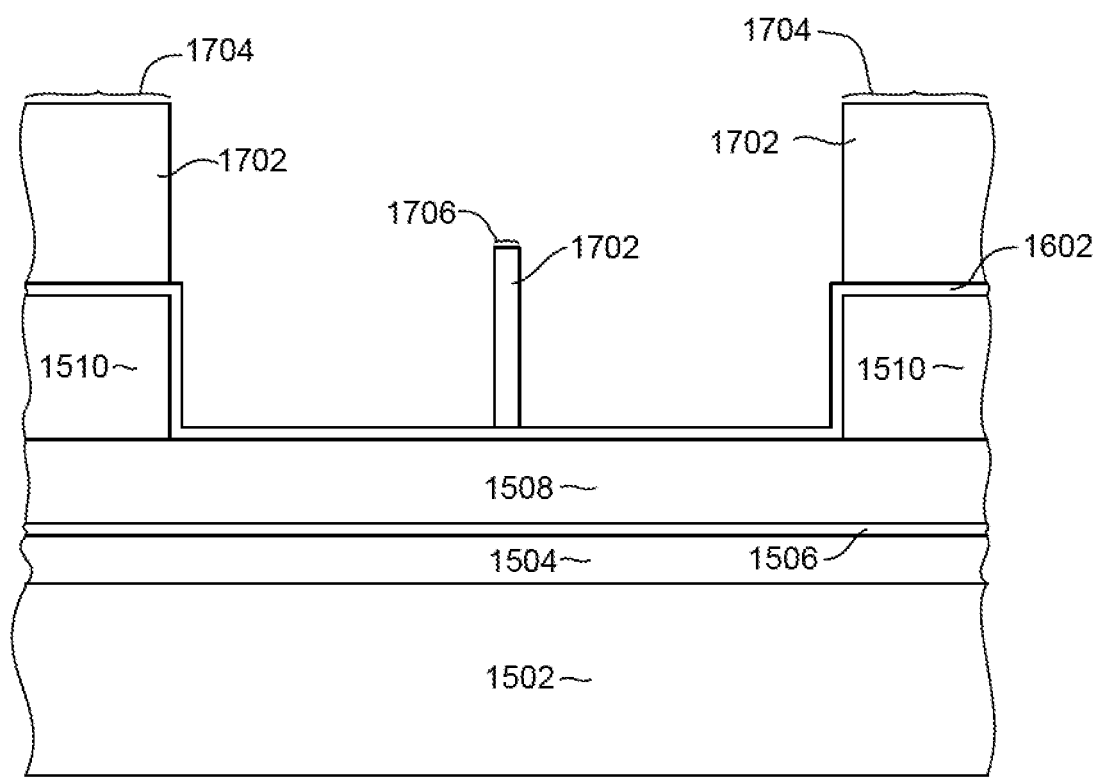

With reference now to FIG. 17, a second resist mask 1702 is formed. This resist mask 1702 is formed by depositing a photoresist material such as a 193 nm wavelength resist material to a thickness of 50-300 nm or about 200 nm, and then photolighographically patterning the resist to form a sensor defining mask. As can be seen in FIG. 17, the second resist mask 1702 has outer portions 1704 in the field area, and has a centrally disposed narrow portion 1706 that is configured to define a dimension of the sensor (e.g. the trackwidth).

Figure 18:
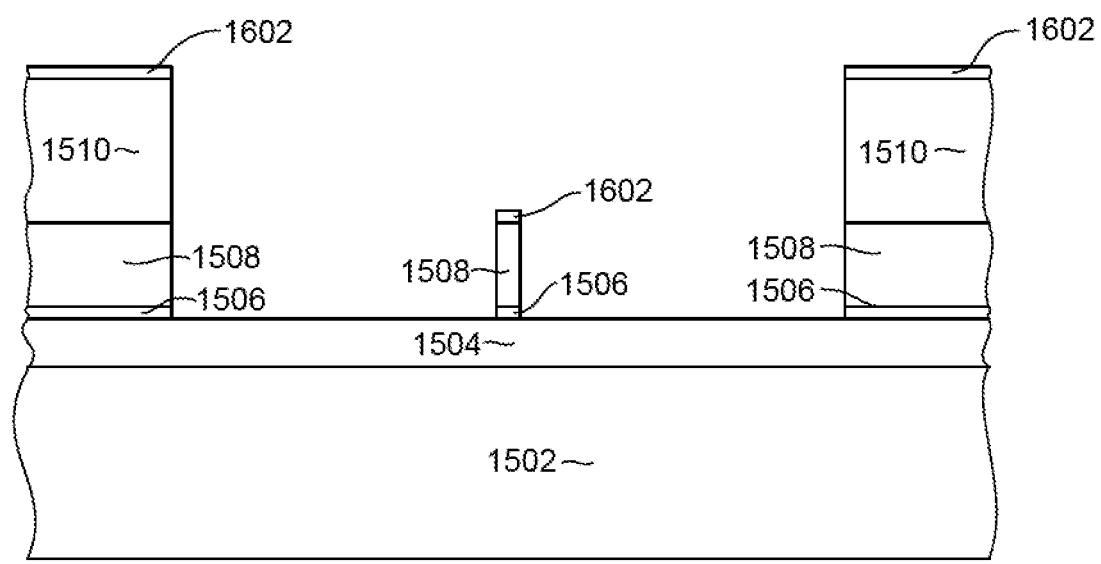
Figure 19:
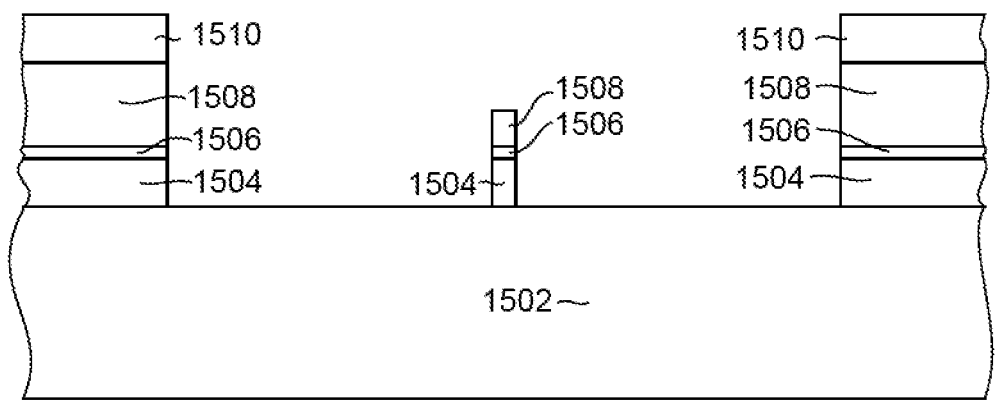
Figure 20:
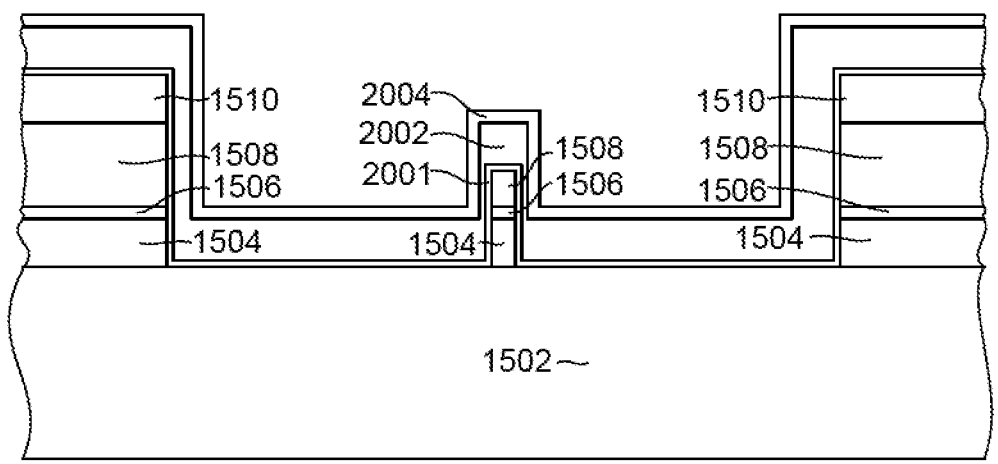

After forming the mask 1704 as shown in FIG. 17, one or more reactive ion etching (RIE) processes can be performed to transfer the image of the mask 1704 onto the under-lying layers 1602, 1508, 1506, leaving a structure as shown in FIG. 18. Then, an ion milling is performed to remove portions of the sensor material 1504 that are not protected by the mask layers 1506, 1508, 1602 (and 1510 in the field area), leaving a structure as shown in FIG. 19. This ion milling defines the sensor dimension of interest (e.g. the trackwidth of the sensor).

After the sensor has been defined by ion milling, a thin insulation layer 2001, hard magnetic material 2002 and second CMP stop material 2004 are deposited. Again, the thin insulation layer 2001 can be alumina and can be deposited by a conformal deposition process such as atomic layer deposition (ALD). The hard magnetic material can be CoPt or CoPtCr and can be deposited by sputter deposition, ion beam deposition or some other process to a thickness that is about level with the top of the sensor layer 1504. The second CMP stop layer 2004 can diamond like carbon (DLC) or amorphous carbon.

Figure 21:
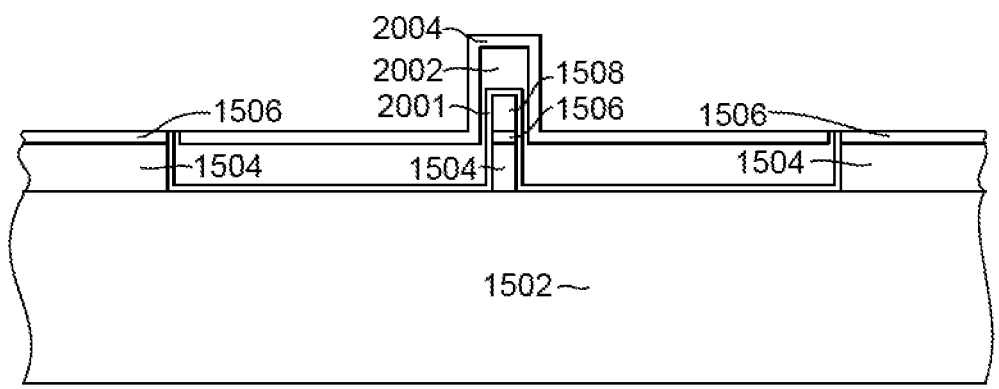

After the layers 2001, 2002, 2004 have been deposited, a liftoff process can be performed. This can include performing a wrinkle bake, performing an NMP chemical liftoff, and performing a snow cleaning process (cleaning using $CO_2$). This liftoff process removes mask material in the field, leaving a structure as shown in FIG. 21.

Figure 22:
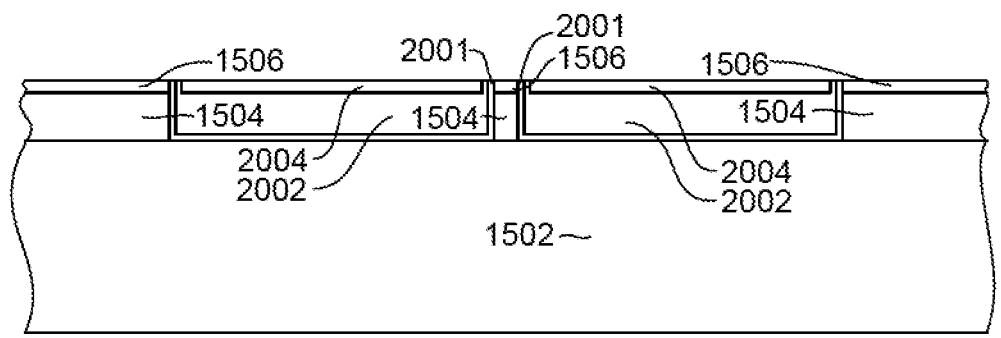
Figure 23:
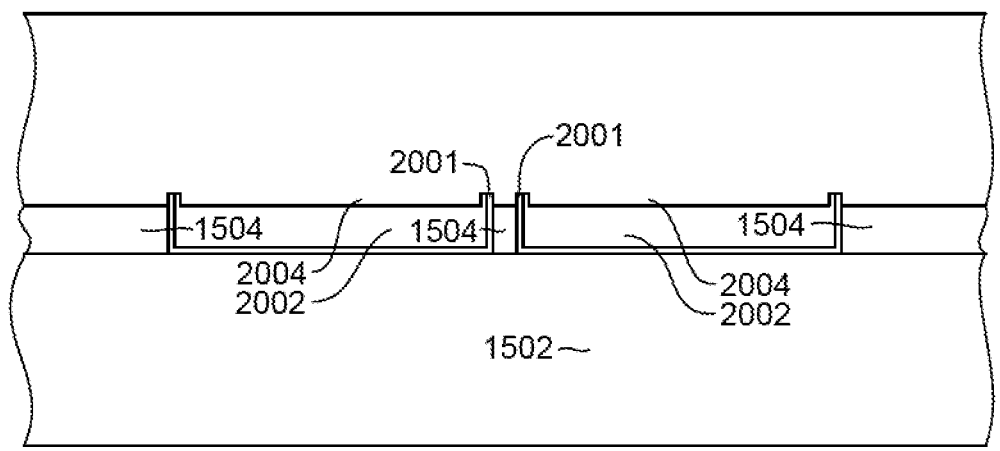
Figure 24:
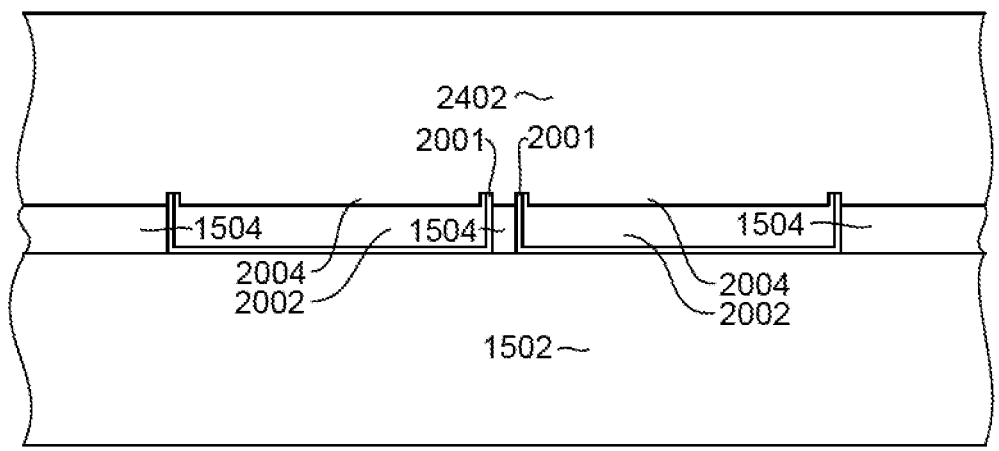

A chemical mechanical polishing process can then be performed, leaving a structure as shown in FIG. 22. Then, a reactive ion etching can be performed to remove the remaining CMP stop material 1506, 2004, leaving a structure as shown in FIG. 23. An upper magnetic shield 2402 can then be formed by an electroplating process, leaving a structure as shown in FIG. 24.

Figure 25:
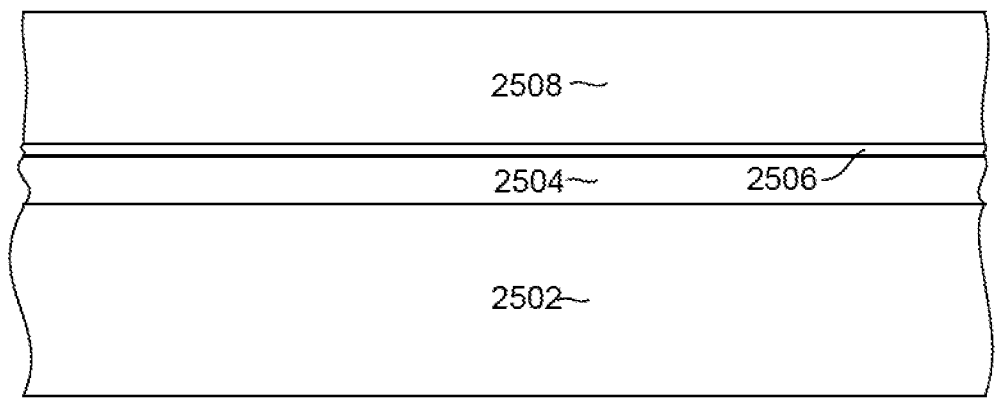
FIGS. 25-34 are views of a magnetic read head in various intermediate stages of manufacture, illustrating a method of manufacturing a magnetic read head according to yet another embodiment of the invention.

FIGS. 25-34 illustrate a method for manufacturing a magnetic sensor according to yet another embodiment of the invention. With particular reference to FIG. 25, a magnetic shield 2502 is formed, and a plurality of sensor layers 2504 is deposited over the shield 2502. A first CMP stop layer 2506, which can be diamond like carbon (DLC) or amorphous carbon is deposited over the sensor layers 2504, and first photoresist layer 2508 is deposited over the first CMP stop layer. It should be pointed out here that, as opposed to the previously discussed processes, there is no image transfer layer such as DURIMIDE® between the first resist layer 2508 and the first CMP stop layer 2506. This will be advantageous for reasons that will become apparent herein below, and is made possible by a novel manufacturing process described herein.

Figure 26:
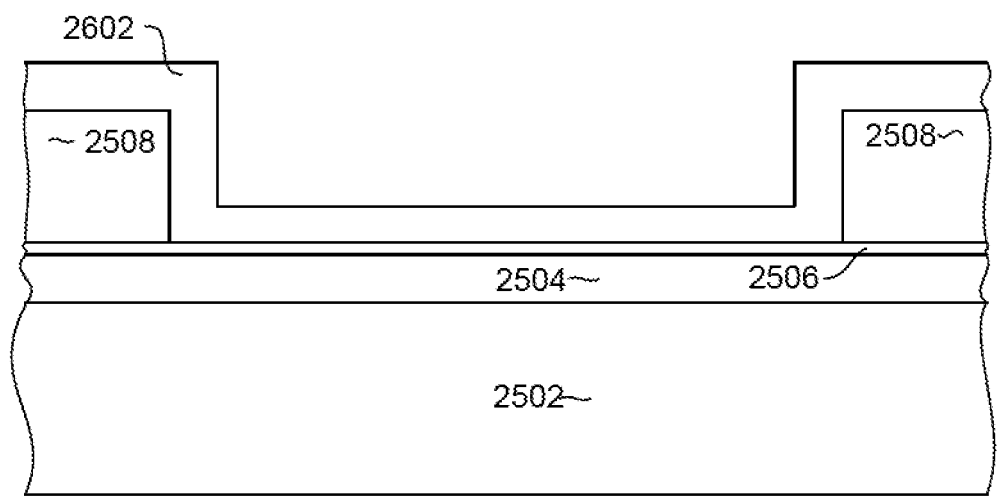

With reference to FIG. 26, the first resist layer 2508 is photolithographically patterned to form a mask that covers the field area and that leaves an area over and around the sensor area uncovered. A hard mask layer 2602 is then deposited over the first mask 2508 and first CMP stop layer 2506. This hard mask layer 2602 includes a material having a low rate of removal by ion milling (low mill rate) and is physically more robust than an organic image transfer layer such as DURIMIDE®. The hard mask layer 2602 can include multiple layers and can be constructed of carbon, diamond like carbon (DLC), SiC, $Al_2O_3$, TaO, $Ta_2O_5$ TiN, etc.

Figure 27:
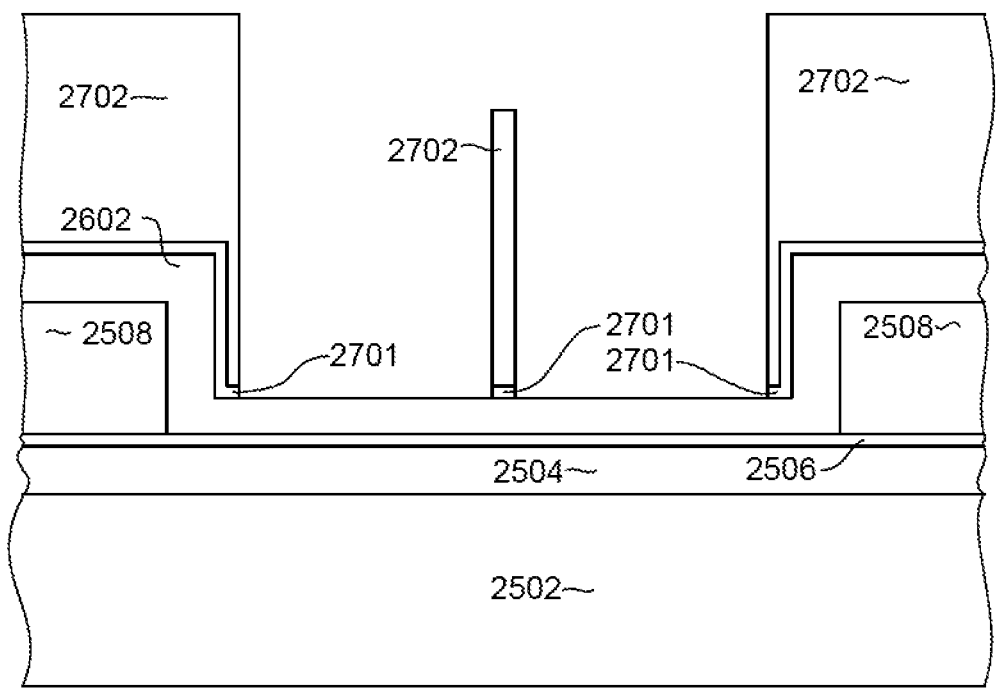
Figure 28:
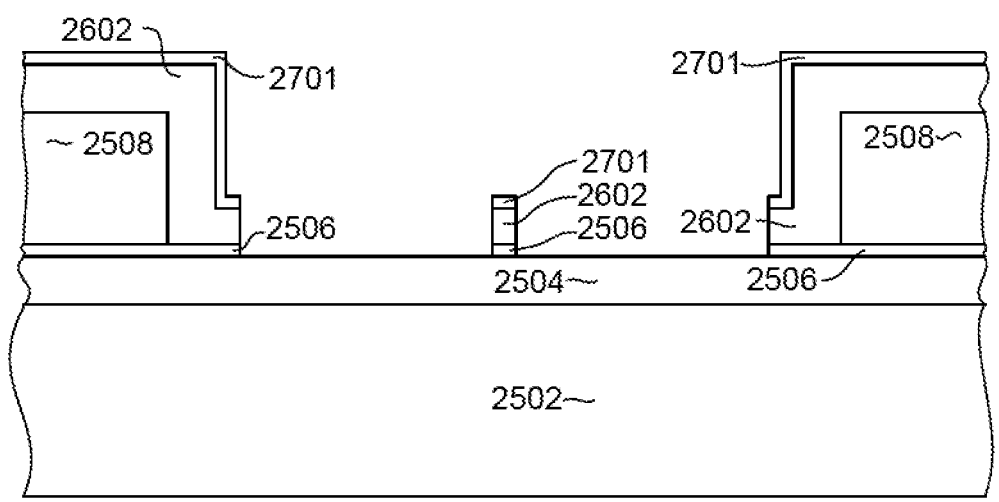
Figure 29:
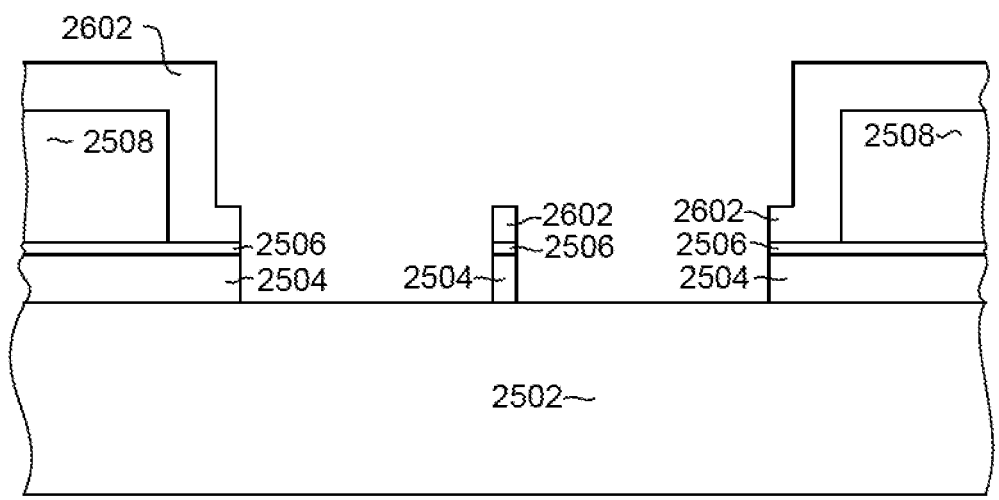

With reference now to FIG. 27, a second mask 2702 is formed by first depositing a second hard mask or spin-on BARC layer 2701, second photoresist layer 2702, and then photolithographically patterning the photoresist layer 2702 followed by image transferring of photoresist layer onto the hard mask or spin-on BARC layer 2701 to form a mask 2701, 2702 that defines a sensor dimension as shown in FIG. 27. One or more reactive ion etching (RIE) processes are then performed to transfer the image of the second resist mask 2702 onto the hard mask 2602, leaving a structure such as that shown in FIG. 28. An ion milling is then performed to remove portions of the sensor material 2504 that are not protected by the hard mask 2602, thereby defining a sensor dimension (such as trackwidth) and leaving a structure as shown in FIG. 29.

Figure 30:
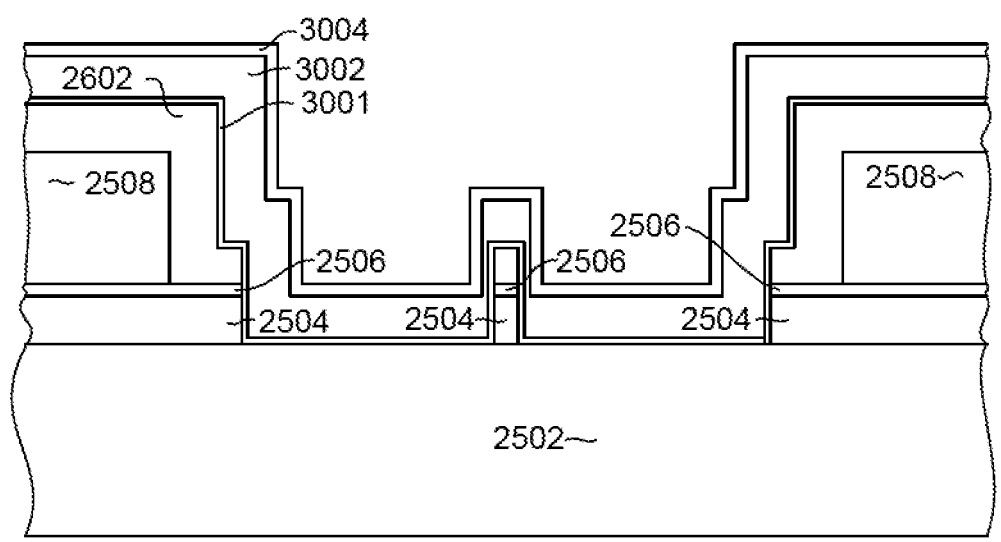

Then, with reference to FIG. 30, a thin insulation layer 3001, hard magnetic bias material layer 3002 and second CMP stop layer 3004 are deposited. As before, the insulation layer 3001 can be alumina, the hard magnetic material 3002, and the second CMP stop layer 3004 can be carbon.

Figure 31:
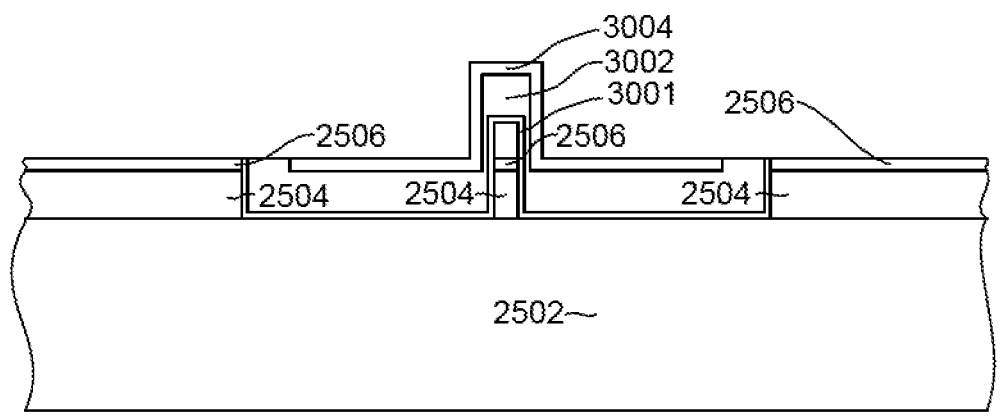
Figure 32:
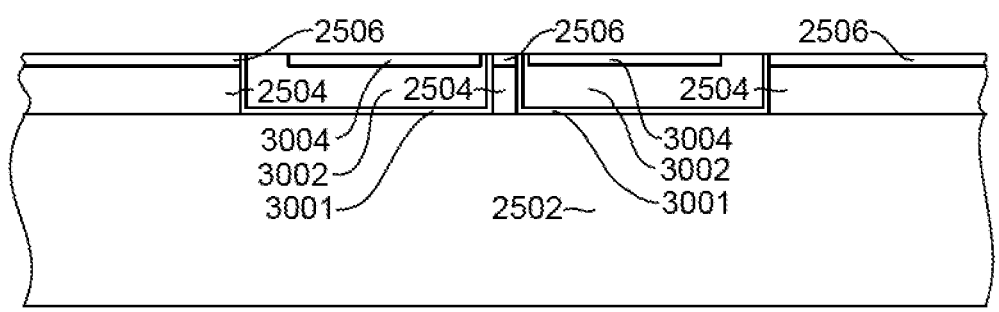
Figure 33:
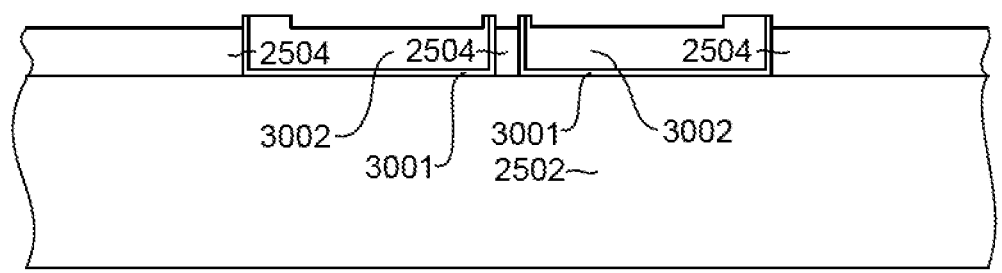
Figure 34:
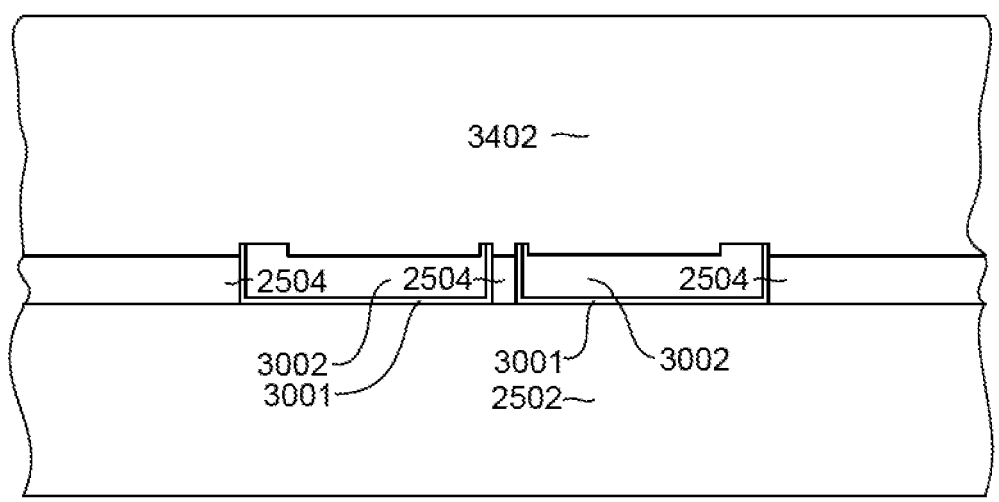

A liftoff process can then be performed to remove the mask layers in the field, leaving a structure as shown in FIG. 31. As with the previously described embodiments, the liftoff process can include wrinkle bake, NMP chemical liftoff and snow cleaning (cleaning with $CO_2$). A chemical mechanical polishing process can then be performed leaving a structure as shown in FIG. 32. This can be followed by a reactive ion etching process to remove the first and second CMP stop layers 2506, 3004, thereby leaving a structure as shown in FIG. 33. Then, with reference to FIG. 34, an upper magnetic shield 3402 can be formed by electroplating a magnetic material such as NiFe.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic read sensor, comprising:
    depositing a plurality of sensor layers;
    forming a first mask structure over the plurality of sensor layers, the first mask structure covering a field area removed from a sensor area and having an opening that extends over the sensor area but that is larger than the sensor area;
    forming a second mask structure over the first mask structure, the second mask structure having a first portion that covers an area configured to define a sensor dimension and having a second portion that is formed over the first mask structure in the field area removed from the sensor area; and
    performing an ion milling to define a sensor dimension.

2. The method as in claim 1 further comprising after performing the ion milling, performing a liftoff process remove the portions of the first structures located in the field area; and
    performing a chemical mechanical polishing.

3. The method as in claim 2 wherein the liftoff process includes a wrinkle bake process and a NMP chemical liftoff.

4. The method as in claim 2 wherein the liftoff process includes a wrinkle bake process, a NMP chemical liftoff, and cleaning with $CO_2$.

5. The method as in claim 1 wherein the opening in the first mask structure encompasses the sensor area and a hard bias region located adjacent to the sensor area.

6. The method as in claim 5, further comprising:
    after performing the ion milling, depositing a thin insulation layer, depositing a hard magnetic material over the thin insulation layer, and depositing a layer of material that is resistant to chemical mechanical polishing; and thereafter
    performing a liftoff process to remove the first mask layer; and
    performing the chemical mechanical polishing.

7. A method for manufacturing a magnetic read sensor, comprising:
    depositing a plurality of sensor layers;
    depositing a chemical mechanical polishing (CMP) stop layer over the plurality of sensor layers;
    forming a first mask structure directly onto the CMP stop layer, the first mask structure covering a field area removed from a sensor area and having an opening that extends over the sensor area and also over an area adjacent to the sensor area;
    depositing a hard mask layer over the CMP stop layer and over the first mask structure;
    forming a second mask structure, the second mask structure having a first portion that covers an area configured to define a sensor dimension and having a second portion that is formed over a portion of the first mask structure that is in the field area removed from the sensor area;
    transferring an image of the second mask structure onto the hard mask layer; and
    performing an ion milling.

8. The method as in claim 7 wherein the hard mask layer comprises C, DLC, SiC, Al2O3, TaO, $Ta_2O_5$ or TiN.

9. The method as in claim 7 wherein the hard mask layer is a multi-layer hard mask having formed of inorganic materials.

10. The method as in claim 7 wherein the second mask is formed by first depositing a second hard mask, depositing and photolithographically patterning a second photoresist layer; performing an image transferring of the second photoresist layer pattern into the second hard mask, and then further image transferring the second hard mask pattern into the hardmask through one or more reactive ion etching (RIE) processes.

* * * * *